United States Patent
Chiu

(10) Patent No.: US 10,715,047 B1
(45) Date of Patent: Jul. 14, 2020

(54) RESONANT POWER CONVERSION DEVICE

(71) Applicant: Chicony Power Technology Co., Ltd., New Taipei (TW)

(72) Inventor: Huan-Chih Chiu, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/387,225

(22) Filed: Apr. 17, 2019

(30) Foreign Application Priority Data

Feb. 15, 2019 (TW) .............................. 108105208 A

(51) Int. Cl.
*H02M 3/335* (2006.01)
*H02M 1/08* (2006.01)
*H02M 1/00* (2006.01)

(52) U.S. Cl.
CPC ......... *H02M 3/33569* (2013.01); *H02M 1/08* (2013.01); *H02M 2001/0009* (2013.01)

(58) Field of Classification Search
CPC ......... H02M 3/33569; H02M 3/33576; H02M 2001/0032; H02M 2001/0058; Y02B 70/1475
USPC .......................... 363/20, 21.02, 21.07, 21.08
See application file for complete search history.

(56) References Cited

U.S. PATENT DOCUMENTS

| | | | | |
|---|---|---|---|---|
| 5,986,895 A * | 11/1999 | Stewart | ................. | H02M 3/337 363/131 |
| 7,502,240 B2 * | 3/2009 | Leung | ............... | H02M 3/33515 307/40 |
| 7,796,406 B2 * | 9/2010 | Lev | ................... | H02M 3/33592 363/132 |
| 8,717,784 B2 | 5/2014 | Park et al. | | |
| 10,170,974 B1 * | 1/2019 | Oh | .......................... | H02M 1/08 |
| 2003/0035304 A1 * | 2/2003 | Gu | ....................... | H03F 1/0227 363/17 |
| 2006/0285366 A1 | 12/2006 | Radecker et al. | | |

(Continued)

FOREIGN PATENT DOCUMENTS

| CN | 101056061 B | 12/2012 |
|---|---|---|
| CN | 101867296 B | 12/2012 |

(Continued)

*Primary Examiner* — Rajnikant B Patel
(74) *Attorney, Agent, or Firm* — Innovation Capital Law Group, LLP; Vic Lin

(57) ABSTRACT

A resonant power conversion device includes a primary side circuit, a frequency detecting circuit, a resonant converting circuit, a secondary side circuit, a secondary detecting circuit, and a control circuit. The primary side circuit receives, according to a control signal having a primary frequency, an input power to output a primary side power. The frequency of the primary side power corresponds to the primary frequency. The frequency detecting circuit detects and converts the primary frequency into a corresponding potential. The resonant converting circuit electrically couples the primary side power to output a resonant power. The secondary side circuit converts the resonant power into a secondary side power. The secondary detecting circuit detects the secondary side power and correspondingly generates a voltage signal. The control circuit outputs the control signal according to the voltage signal, and doesn't output the control signal when the corresponding potential is higher than a predetermined level.

11 Claims, 6 Drawing Sheets

(56) References Cited

U.S. PATENT DOCUMENTS

| | | | |
|---|---|---|---|
| 2011/0182088 A1* | 7/2011 | Lidak | ............... H02M 3/33507 |
| | | | 363/21.12 |
| 2017/0244323 A1 | 8/2017 | Leisten et al. | |
| 2017/0331383 A1 | 11/2017 | Hsiao et al. | |

FOREIGN PATENT DOCUMENTS

| | | |
|---|---|---|
| CN | 203387407 U | 1/2014 |
| CN | 105119495 A | 12/2015 |
| CN | 106059322 A | 10/2016 |
| TW | 201238221 A | 9/2012 |
| TW | I389437 B | 3/2013 |
| TW | 201541840 A | 11/2015 |
| TW | 201838307 A | 10/2018 |

\* cited by examiner

RESONANT POWER CONVERSION DEVICE

CROSS-REFERENCE TO RELATED APPLICATION

This non-provisional application claims priority under 35 U.S.C. § 119(a) to Patent Application No. 108105208 filed in Taiwan, R.O.C. on Feb. 15, 2019, the entire contents of which are hereby incorporated by reference.

BACKGROUND

Technical Field

The present disclosure relates to a resonant power conversion device, and in particular, to a resonant power conversion device having a frequency detecting circuit.

Related Art

FIG. 1 illustrates a function block diagram of a LLC series resonant convertor (LLC-SRC) known to the inventors. The LLC-SRC includes a transformer Tr, a first power switch Q1 and a second power switch Q2 connected in series, a magnetizing inductor Lm connected in parallel to a primary side winding of the transformer Tr, a resonant inductor Lr connected in series to the magnetizing inductor Lm, and a resonant capacitor Cr connected in series to the magnetizing inductor Lm. The resonant inductor Lr, the magnetizing inductor Lm and the resonant capacitor Cr constitute a first resonant frequency $\omega_p$. The resonant inductor Lr and the resonant capacitor Cr constitute a second resonant frequency $\omega_r$. The resonant inductor Lr, the resonant capacitor Cr and a parasitic capacitor constitute a third resonant frequency $\omega_s$. The power switches Q1 and Q2 are controlled to conduct the input power Vi selectively to the resonant inductor Lr, the magnetizing inductor Lm and the resonant capacitor Cr to implement zero voltage switching (ZVS) which improves the electric energy conversion efficiency.

When the LLC-SRC operates, the convertor detects an output voltage $V_0$. When the output voltage $V_o$ is greater than a default value, it is determined that the current load of the convertor is in a light load state. In this case, in order to prevent the voltage gain from distortion during the LLC-SRC operates under the light load (the voltage gain is the ratio of the output voltage $V_o$ to the input voltage $V_i$), the convertor controls the power switches Q1 and Q2 to stop outputting the voltage output.

Referring to FIG. 1 and FIG. 2 at the same time, FIG. 2 illustrates a schematic diagram of the operating frequency and gain curve of the LLC-SRC of FIG. 1 operating under a light load. The light load of FIG. 2 means that the LLC-SRC operates below 20% of the rated load. The horizontal axis of FIG. 2 is the frequency, and the vertical axis is the gain. The dot-and-dash line of FIG. 2 shows the relationship between the operating frequency and the voltage gain of the LLC-SRC of FIG. 1 operating at 20% of the rated load. The broken line of FIG. 2 shows the relationship between the operating frequency and the voltage gain of the LLC-SRC of FIG. 1 operating at 10% of the rated load. The solid line of FIG. 2 shows the relationship between the operating frequency and the voltage gain of the LLC-SRC of FIG. 1 operating without load. According to FIG. 2, when the LLC-SRC r operates under a light load and the operating frequency of the convertor is between the first resonant frequency $\omega_p$ and the second resonant frequency $\omega_r$, the output voltage $V_o$ rises as the load decreases. In the case, in order to maintain a stable output voltage $V_0$, the LLC-SRC reduces the voltage gain by increasing the operating frequency. However, as the operating frequency of the LLC-SRC is gradually increased to between the second resonant frequency $\omega_r$ and the third resonant frequency $\omega_s$, the voltage gain is no longer reduced in response to the increase in the operating frequency. In contrast, the voltage gain increases in response to the increase in the operating frequency due to interference by the parasitic capacitance distributed on the high-frequency transformer. In the case where the gain is not reduced but increased when the LLC-SRC operates under a light load, the output voltage $V_o$ of the LLC-SRC is very likely unstable. Therefore, the LLC-SRC outputs an unstable voltage $V_o$ when the operating frequency of the convertor is higher than the second resonant frequency $\omega_r$. The unstable voltage $V_o$ cannot meet needs of the light load.

In accordance with FIG. 2, in a light load situation, the LLC-SRC stops the operation of the power switches Q1 and Q2 (not conducting) when the output voltage $V_o$ is greater than the default value, and starts the operation of the power switches Q1 and Q2 when the output voltage $V_o$ decreases to a proper voltage value. Here, the power switches Q1 and Q2 will be controlled to conduct and not to conduct alternatively. If the LLC-SRC only controls the operation of the power switches Q1 and Q2 according to the output voltage $V_o$, the number of the stop and start of the power switch Q1 and Q2 will be increased which is higher than actual needs of the light load and the energy is not properly saved.

SUMMARY

To address the above problems, a resonant power conversion device includes a primary side circuit, a frequency detecting circuit, a resonant converting circuit, a secondary side circuit, a secondary detecting circuit, and a control circuit. The primary side circuit is configured to receive an input power to output a primary side power according to a control signal. The control signal has a primary frequency, and a frequency of the primary side power corresponds to the primary frequency. The frequency detecting circuit is configured to detect the primary frequency and convert the primary frequency into a corresponding potential. The resonant converting circuit is configured to electrically couple the primary side power to output a resonant power. The secondary side circuit is configured to convert the resonant power into a secondary side power. The secondary detecting circuit is configured to detect the secondary side power and generate a voltage signal corresponding to the secondary side power. The control circuit is configured to output the corresponding control signal according to the voltage signal, and not to output the control signal when the corresponding potential is higher than a predetermined level.

In some embodiments, the primary side circuit includes a first switch and a second switch. The first switch and the second switch are connected in series and then connected in parallel to the input power. The first switch and the second switch works according to the control signal. The first switch and the second switch are not conducting simultaneously.

In some embodiments, the primary side circuit further includes a primary side convertor. The primary side convertor includes a subtractive polarity winding and an additive polarity winding. The subtractive polarity winding is configured to generate a first gate control signal in response to the control signal, and the additive polarity winding is configured to generate a second gate control signal in response to the control signal.

In some embodiments, the frequency detecting circuit includes an isolation component, an energy storage component, and an energy consuming component. The isolation component is configured to receive one of the first gate control signal and the second gate control signal, and only allow the received first gate control signal or second gate control signal to pass in a single direction. The energy storage component is configured to receive the first gate control signal or the second gate control signal passing the isolation component to generate the corresponding potential. The corresponding potential is directly proportional to the primary frequency. The energy consuming component is connected in parallel to the energy storage component, and the energy consuming component is configured to release the corresponding potential. The primary frequency, the energy storage component and the energy consuming component determine the corresponding potential.

In some embodiments, the secondary detecting circuit includes a voltage detecting circuit, a current detecting circuit, and an oscillation control circuit. The voltage detecting circuit is configured to detect a voltage of the secondary side power and generate a fourth resistance value. The current detecting circuit is configured to detect a current of the secondary side power and generate a sixth resistance value. The oscillation control circuit is configured to receive the fourth resistance value and the sixth resistance value and convert the fourth resistance value and the sixth resistance value into the voltage signal.

In some embodiments, the voltage detecting circuit includes a voltage dividing circuit, a first comparison circuit, and a first isolation circuit. The voltage dividing circuit is configured to divide the voltage of the secondary side power to generate a voltage dividing value. The first comparison circuit has a reference level. The first comparison circuit is configured to compare the voltage dividing value with the reference level. The first comparison circuit generates a first resistance value when the voltage dividing value is less than the reference level. The the first comparison circuit generates a second resistance value when the voltage dividing value is greater than the reference level. When the first comparison circuit has the second resistance value, the first isolation circuit generates a first current signal flowing to the first comparison circuit and the first isolation circuit generates a fourth resistance value. When the first comparison circuit has the first resistance value, the first isolation circuit does not generate the first current signal and the first isolation circuit generates a third resistance value. The fourth resistance value is less than the third resistance value.

In some embodiments, the current detecting circuit includes a detecting unit, and a feedback circuit. The detecting unit is configured to detect the current of the secondary side power and convert the current of the secondary side power into a detecting voltage. The feedback circuit has a reference level. The feedback circuit compares the detecting voltage with the reference level. The feedback circuit generates a fifth resistance value when the detecting voltage is less than the reference level. The feedback circuit generates the sixth resistance value when the detecting voltage is greater than the reference level. The sixth resistance value is less than the fifth resistance value.

In some embodiments, the oscillation control circuit includes an arithmetic unit, and a resistance circuit. The arithmetic unit is configured to generate an adjusted resistance value by calculating based on the fourth resistance value and the sixth resistance value. The resistance circuit is configured to receive the adjusted resistance value and generate the corresponding voltage signal according to the magnitude of the adjusted resistance value, the voltage signal being directly proportional to the adjusted resistance value.

In some embodiments, the secondary detecting circuit includes a voltage detecting circuit, configured to detect the voltage of the secondary side power and generate a voltage signal.

In some embodiments, the voltage detecting circuit includes a voltage dividing circuit, a first comparison circuit, a first isolation circuit, and a resistance circuit. The voltage dividing circuit is configured to divide the voltage of the secondary side power to generate a voltage dividing value. The first comparison circuit has a reference level. The first comparison circuit is configured to compare the voltage dividing value with the reference level, and generate a second resistance value when the voltage dividing value is greater than the reference level. When the first comparison circuit has a first resistance value, the first isolation circuit cannot generate a first current signal, and the first isolation circuit generates the third resistance value. When the first comparison circuit has the second resistance value, the first isolation circuit generates the first current signal, and the isolation circuit generates the fourth resistance value. The fourth resistance value is less than the third resistance value. The resistance circuit is configured to receive a resistance value of the first isolation circuit and generate the corresponding voltage signal according to the magnitude of the resistance value of the first isolation circuit. The voltage signal is directly proportional to the resistance value of the first isolation circuit.

In some embodiments, the frequency detecting circuit includes an isolation component, an energy storage component, and an energy consuming component. The isolation component is configured to receive the control signal, and only allow the control signal to pass in a single direction. The energy storage component is configured to receive the passing control signal to generate a corresponding potential. The energy consuming component is connected in parallel to the energy storage component, and the energy consuming component is configured to release the corresponding potential. The corresponding potential is directly proportional to the primary frequency. The primary frequency, the energy storage component and the energy consuming component determine the corresponding potential.

In summary, according to some embodiments, the resonant power conversion device can determine whether the primary frequency is between the second resonant frequency and the third resonant frequency under a light load. If so, the output of the control signal is temporarily stopped.

DETAILED DESCRIPTION

The terminology used herein is for the purpose of describing particular embodiments only and is not intended to be limiting of the invention. When "turn on" is used to describe a state of a solid state switch in this specification, "turn on" means the solid state switch operates as a "closed switch" (saturated state, conducting). When "turn off" is used to describe a state of a solid state switch in this specification, "turn off" means the solid state switch operates as an "open switch" (cut-off state, not conducting).

Figure 3:
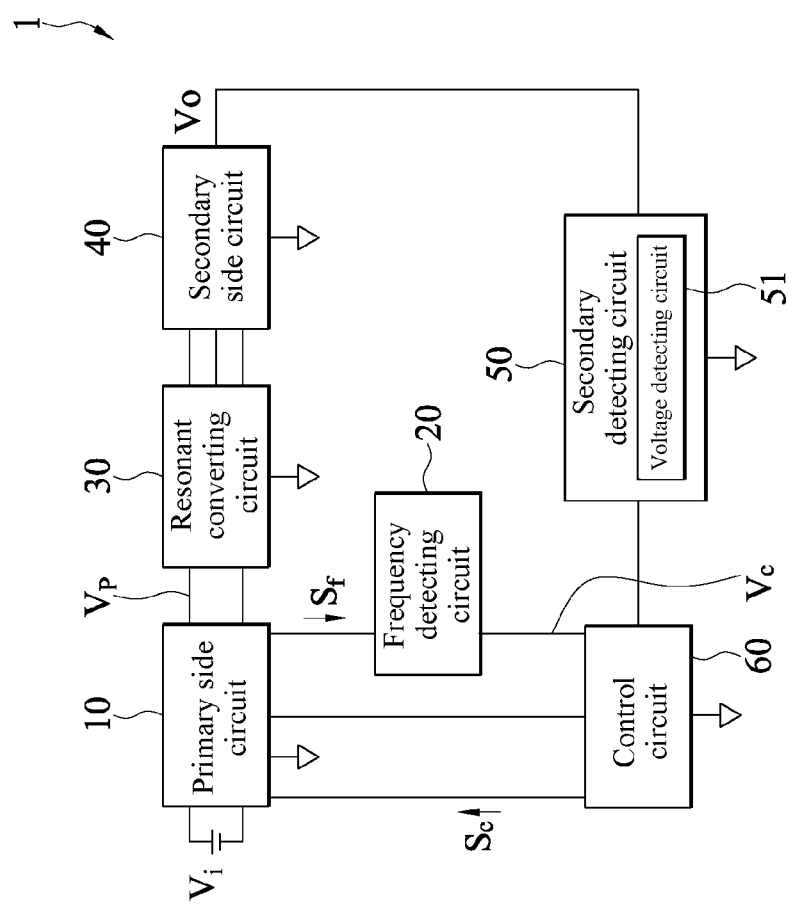
FIG. 3 illustrates a function block diagram of a first embodiment of the resonant power conversion device of the present disclosure.

FIG. 3 illustrates a function block diagram of a first embodiment of the resonant power conversion device of the present disclosure. The resonant power conversion device 1 includes a primary side circuit 10, a frequency detecting circuit 20, a resonant converting circuit 30, a secondary side circuit 40, a secondary detecting circuit 50, and a control circuit 60.

The primary side circuit 10 is configured to receive an input power $V_i$ to output a primary side power $V_p$ according to a control signal $S_c$. The control signal $S_c$ has a primary frequency, and a frequency of the primary side power $V_p$ corresponds to the primary frequency. In some embodiments, the frequency of the primary side power $V_p$ is the primary frequency. The primary side circuit 10 is, for example but not limited to, a square wave generating circuit. The square wave generating circuit outputs a continuous square wave composed of a high potential and a low potential when the control signal $S_c$ is received from the control circuit 60, and the continuous square wave includes the primary frequency for the resonant converting circuit 30 to electrically couple the primary side power $V_p$ to output the resonant power. In addition, the primary side circuit 10 generates another gate control signal $S_f$ including the primary frequency for detection by the frequency detecting circuit 20.

Figure 1:
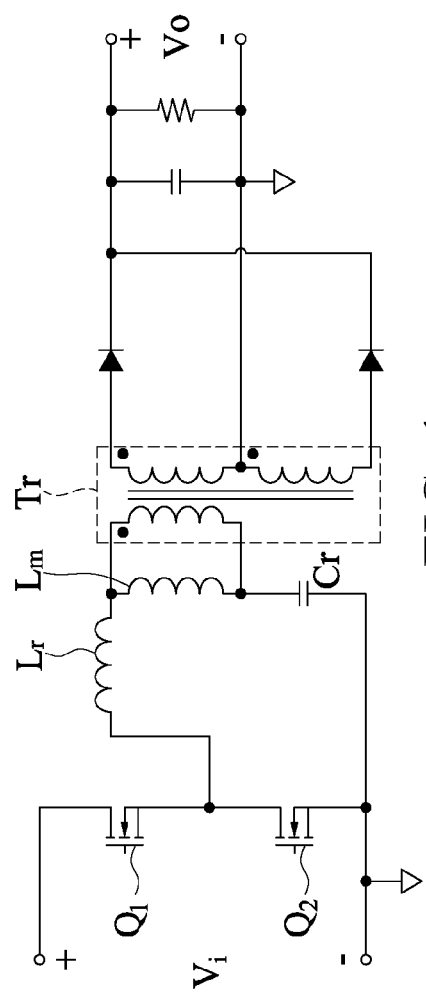
FIG. 1 illustrates a function block diagram of a LLC-SRC known to the inventors.
Figure 2:
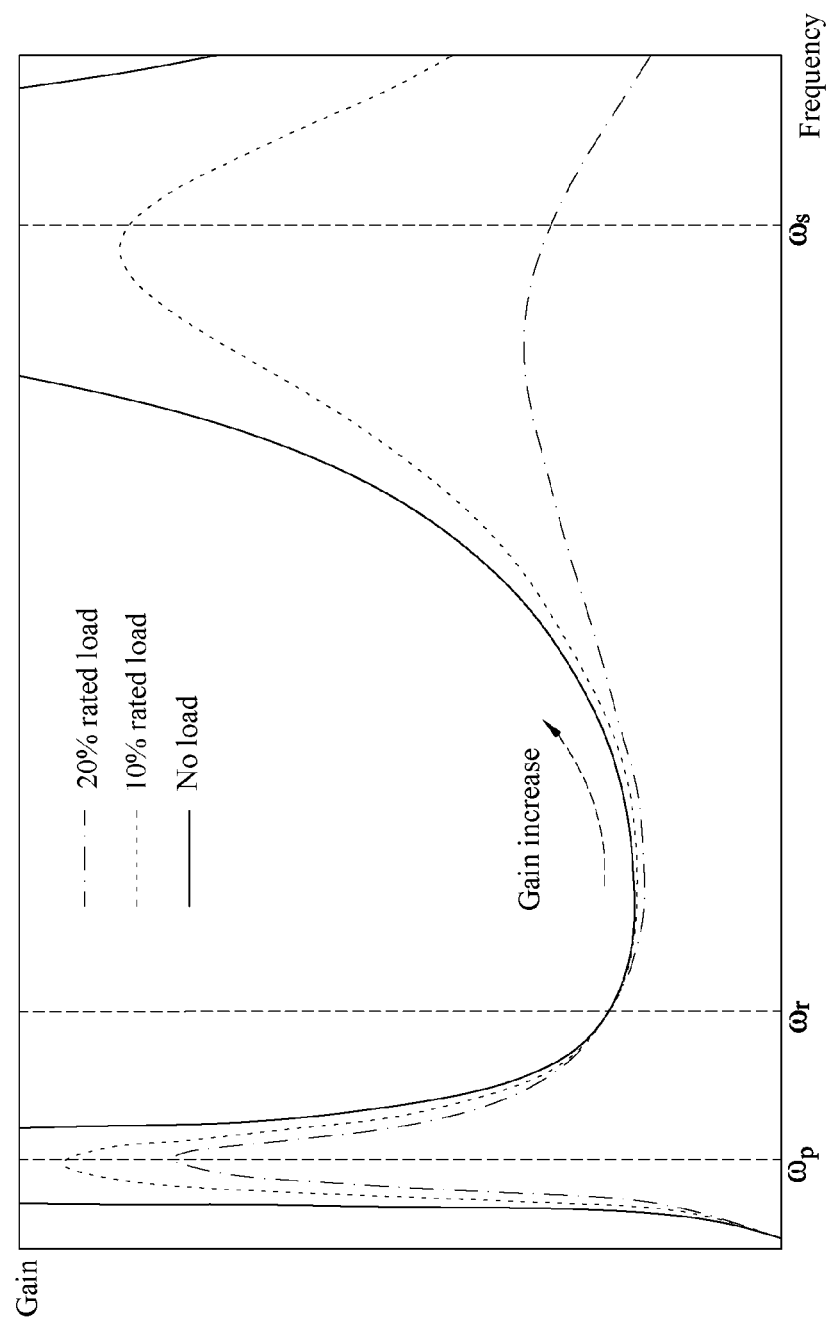
FIG. 2 illustrates a schematic diagram of the operating frequency and gain curve of the LLC resonant convertor of FIG. 1 operating under a light load.

The frequency detecting circuit 20 is configured to detect the primary frequency and convert the primary frequency into a corresponding potential $V_c$. In the process in which the primary side circuit 10 converts the input power $V_i$ into the primary side power $V_p$, the frequency detecting circuit 20 receives the gate control signal $S_f$ including the primary frequency from the primary side circuit 10, changes the primary side power $V_p$ with the primary frequency, and generates the corresponding potential $V_c$ for the control circuit 60 to determine whether the primary frequency is between the second resonant frequency $\omega_r$ and the third resonant frequency $\omega_s$ (see FIG. 2). If so, the secondary side power $V_o$ output by the secondary side circuit 40 cannot be lowered by increasing the primary frequency, that is, the secondary side power $V_o$ cannot provide a stable power required for a light load. Here, the control circuit 60 can temporarily stop outputting the control signal $S_c$. If not, the secondary side power $V_o$ output by the secondary side circuit 40 can be lowered by increasing the primary frequency. Here, the control circuit 60 can output the control signal $S_c$.

The resonant converting circuit 30 is configured to electrically couple the primary side power $V_p$ to output a resonant power. The resonant converting circuit 30 is, for example but not limited to, a center tapped transformer, a two-winding transformer, or a three-winding transformer.

The secondary side circuit 40 is configured to convert the resonant power into a secondary side power $V_o$. Here, converting the power means that the resonant power is rectified and filtered to become the secondary side power $V_o$.

The secondary detecting circuit 50 is configured to detect the secondary side power $V_o$ and generate a voltage signal corresponding to the secondary side power $V_o$.

The control circuit 60 is configured to output the corresponding control signal $S_c$ according to the voltage signal. The control circuit 60 is configured not to output the control signal $S_c$ when the corresponding potential $V_c$ is higher than a predetermined level.

In operation, the control circuit 60 controls the primary side circuit 10 to output the primary side power $V_p$ in the mode of pulse frequency modulation by the control signal $S_c$, that is, the control circuit 60 modulates the primary frequency. Further, when the primary side power $V_p$ is in the mode of pulse frequency modulation, the ratio of the on-time of the primary side power $V_p$ to the duty cycle is a constant value, for example but not limited to 50%. The control circuit 60 receives the voltage signal fed back by the secondary detecting circuit 50 to determine that the secondary side circuit 40 is under a light load. Next, the control circuit 60 compares the corresponding potential $V_c$ with the predetermined level under a light load to determine whether the primary frequency is between the second resonant frequency $\omega_r$ and the third resonant frequency $\omega_s$. If so, the control circuit 60 can temporarily stop outputting the control signal $S_c$. If not, the control circuit 60 outputs the control signal $S_c$. The control circuit 60 is, for example but not limited to, an integrated circuit (IC) having this operational function.

Figure 4:
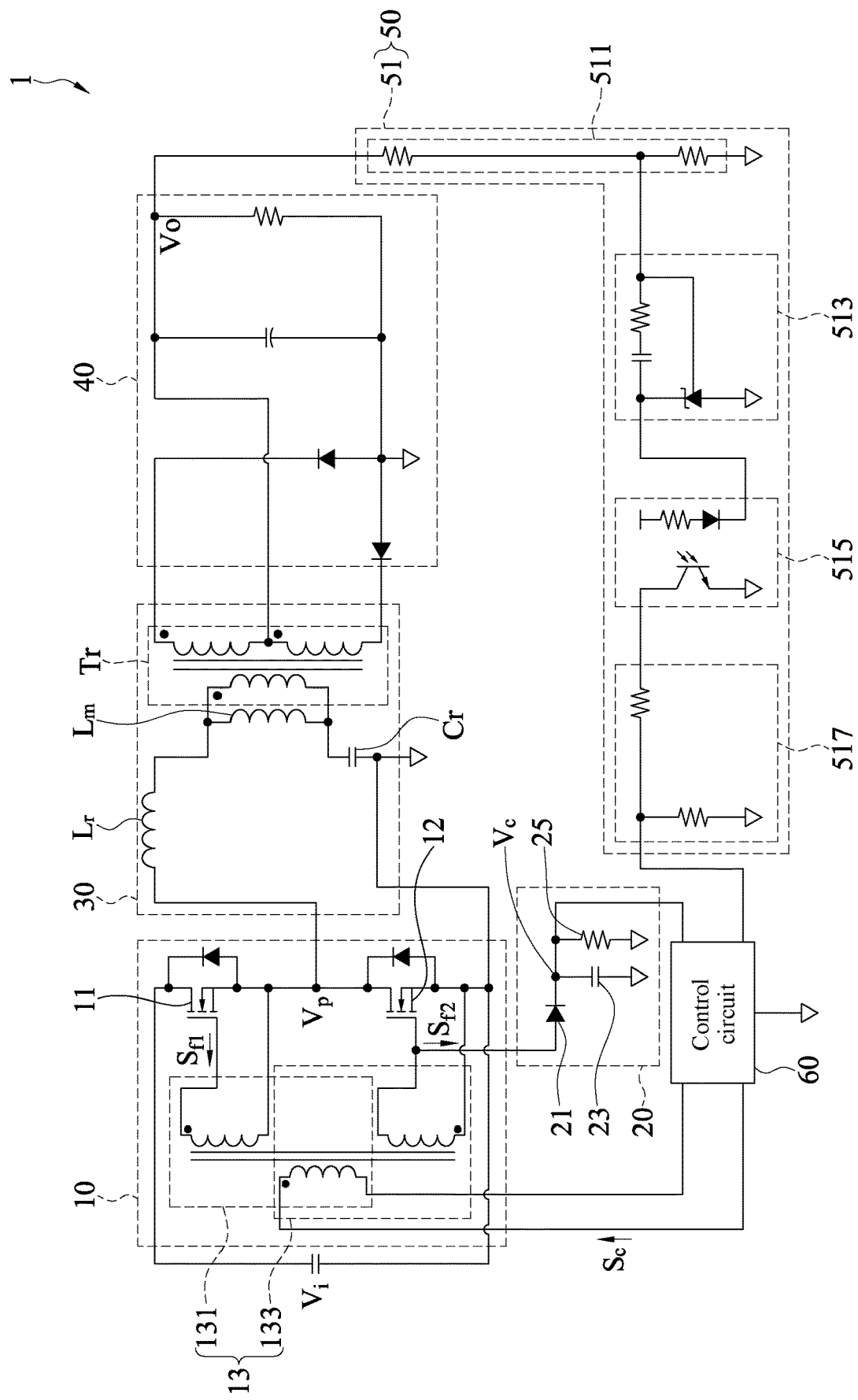
FIG. 4 illustrates a function block diagram of a second embodiment of the resonant power conversion device of the present disclosure.

FIG. 4 illustrates a function block diagram of a second embodiment of the resonant power conversion device of the present disclosure. The primary side circuit 10 includes a first switch 11 and a second switch 12. The first switch 11 and the second switch 12 are connected in series and driven by the control signal $S_c$. The first switch 11 and the second switch 12 are configured to respectively receive the control signal $S_c$ (described in detail later) to be selectively turned on (conducting) and turned off (not conducting). When the first switch 11 is turned on, the second switch 12 is not turned on; vice versa. In some embodiments, the first switch 11 is turned on or off according to a first gate control signal $S_{f1}$ that is in the same phase as the control signal $S_c$. The second switch 12 is turned on or off according to a second gate control signal $S_{f2}$ that is opposite in phase to the control signal $S_c$. The first switch 11 and the second switch 12 are not turned on simultaneously. That is, the first switch 11 and the second switch 12 can alternately output a continuous square wave composed of a high potential and a low potential according to the control signal $S_c$ having the primary frequency. The first switch 11 and the second switch 12 are, for example but not limited to, solid state switches like bipolar junction transistors (BJT), metal-oxide-semiconductor field effect transistors (MOSFET), or insulated gate bipolar transistors (IGBT).

In some embodiments, the primary side circuit 10 further includes a primary side convertor 13. The primary side convertor 13 includes a subtractive polarity winding 131 (the winding orientation of the primary side is the same as that of the secondary side) and an additive polarity winding 133 (the winding orientation of the primary side is opposite to that of the secondary side). The subtractive polarity winding 131 generates a first gate control signal $S_{f1}$ in response to the control signal $S_c$, and the first gate control signal $S_{f1}$ is in the same phase as the control signal $S_c$. On the other hand, the additive polarity winding 133 generates a second gate control signal $S_{f2}$ in response to the control signal $S_c$, and the second gate control signal $S_{f2}$ is opposite in phase to the control signal $S_c$. Here, the primary side convertor 13 alternately outputs continuous square waves composed of a high potential and a low potential by controlling that the first switch 11 and the second switch 12.

Referring to FIG. 4 again, the frequency detecting circuit 20 includes an isolation component 21, an energy storage component 23, and an energy consuming component 25. The isolation component 21 is configured to receive one of the first gate control signal $S_{f1}$ and the second gate control signal $S_{f2}$, and only allow the received first gate control signal $S_{f1}$ or the second gate control signal $S_{f2}$ to pass in a single direction. The energy storage component 23 is configured to receive the first gate control signal $S_{f1}$ or the second gate control signal $S_{f2}$ passing the isolation component 21 to generate the corresponding potential $V_c$. The corresponding potential $V_c$ is directly proportional to the primary frequency; that is, the corresponding potential $V_c$ increases as the primary frequency increases. The energy consuming component 25 is connected in parallel to the energy storage component 23. The energy consuming component 25 releases the corresponding potential $V_c$. The corresponding potential $V_c$ is determined by the primary frequency, the energy storage component 23 and the energy consuming component 25.

Referring to FIG. 4 again, the isolation element 21 is, for example but not limited to, a diode. The diode only allows the second gate control signal $S_{f2}$ to pass in a single direction. The isolation component 21 is electrically connected to the second switch 12 to detect the second gate control signal $S_{f2}$. When the second gate control signal $S_{f2}$ is greater than the cut-in voltage of the diode, the diode is turned on. In some embodiments, another isolation component similar to the isolation component 21 is electrically connected to the first switch 11 to detect the first gate control signal $S_{f1}$. Its operation mode is similar to that of the isolation components 21.

The energy storage component 23 is, for example but not limited to, a capacitor. The capacitor produces a corresponding potential $V_c$. When the diode is conducting, the second gate control signal $S_{f2}$ flows through the capacitor, so that the capacitor stores the electrical energy of the second gate control signal $S_{f2}$ and the corresponding potential $V_c$ varies in accordance with the voltage of the second gate control signal $S_{f2}$. When the primary frequency rises, the corresponding potential $V_c$ increases as the primary frequency rises.

The energy consuming component 25 is, for example but not limited to, a resistor that releases the corresponding potential $V_c$. When the diode is not turned on, the corresponding potential $V_c$ flows through the resistor, so that the resistor releases the corresponding potential $V_c$. When the primary frequency falls, the corresponding potential $V_c$ decreases as the primary frequency falls.

Referring to FIG. 4 and FIG. 2 again, the resonant converting circuit 30 includes the transformer Tr, the resonant inductor Lr, the magnetizing inductor Lm, and the resonant capacitor Cr. The resonant inductor Lr, the magnetizing inductor Lm, and the resonant capacitor Cr are sequentially connected in series. One end of the resonant inductor Lr can receive the primary side power $V_p$ including the primary frequency from the first switch 11 and the second switch 12 connected in series. When the primary frequency is higher than the second resonant frequency $\omega_r$, due to the existence of the equivalent parasitic capacitor of the primary side winding of the transformer Tr, and after the gain curve is higher than the second resonant frequency $\omega_r$, the gain curve has another resonance point induced by the circuit where the parasitic capacitor is connected in parallel to the magnetizing inductor Lm. This causes the gain showed by the gain curve to become higher with increasing frequency under light load conditions, and the lighter the load is, the more obvious the phenomenon is. This will result in an unstable output voltage under light load conditions.

Referring to FIG. 4 again, the secondary side circuit 40 is, for example but not limited to, a full-wave rectifier and filter circuit. The full-wave rectifier and filter circuit is electrically connected to the secondary side winding of the above transformer Tr, and rectifies and filters the resonant power to output the secondary side power $V_o$. When the primary frequency is higher than the second resonant frequency $\omega_r$, the full-wave rectifier and filter circuit generates the parasitic capacitance. As the parasitic capacitance increases, the secondary side power $V_o$ output by the secondary side circuit 40 also increases.

Referring to FIG. 4 again, the secondary detecting circuit 50 includes a voltage detecting circuit 51. The voltage detecting circuit 51 is configured to detect the voltage of the secondary side power $V_o$ and generate a voltage signal. The voltage detecting circuit 51 includes a voltage dividing circuit 511, a first comparison circuit 513, a first isolation circuit 515, and a resistance circuit 517. The voltage dividing circuit 511 is configured to divide the voltage of the secondary side power $V_o$ to generate a voltage dividing value. The first comparison circuit 513 has a reference level. The first comparison circuit 513 is configured to compare the voltage dividing value with the reference level. The first comparison circuit 513 generates a first resistance value when the voltage dividing value is less than the reference level, and the first comparison circuit 513 generates a second resistance value when the voltage dividing value is greater than the reference level. Specifically, when the first comparison circuit 513 has the first resistance value, a light-emitting diode on the primary side of the first isolation circuit 515 does not emit light. When the voltage dividing value is greater than the reference level, the first comparison circuit 513 changes from the first resistance value to the second resistance value, the light-emitting diode on the primary side of the first isolation circuit 515 emits light, and a photosensitive transistor on the secondary side of the first isolation circuit 515 is turned on (conducting). The total resistance value of the resistance circuit 517 can be reduced by the first comparison circuit 513 being converted to the second resistance value. When the total resistance value of the resistance circuit 517 becomes smaller, the control circuit 60 can determine that the secondary side circuit 40 is under a light load. In this embodiment, the first resistance value is greater than the second resistance value. The voltage dividing circuit 511 is, for example but not limited to, two resistors sequentially connected in series.

The first comparison circuit 513 is, for example but not limited to, a comparison circuit including a three-terminal shunt regulator. The three-terminal shunt regulator has a reference level of 2.5 volts. When the voltage dividing value is greater than 2.5 volts, the first isolation circuit 515 generates a first current signal to the first comparison circuit 513.

When the first comparison circuit 513 has a first resistance value, the first isolation circuit 515 cannot generate the first current signal. When the first comparison circuit 513 changes to the second resistance value, the first isolation circuit 515 generates the first current signal. The second resistance value is less than the first resistance value. The first isolation circuit 515 is, for example but not limited to, an isolation circuit including an optical coupler. The optical coupler has a light-emitting diode and a photosensitive transistor. The light-emitting diode is connected in series with the three-terminal shunt regulator. The photosensitive transistor on the secondary side of the first isolation circuit 515 is connected in series with the resistance circuit 517. When the light-emitting diode does not receive the first current signal, the resistance value of the photosensitive transistor is changed into a third resistance value. When the light-emitting diode receives the first current signal, the resistance value of the photosensitive transistor is changed into a fourth resistance value. That is, when the photosensitive transistor of the first isolation circuit 515 is turned on, the photosensitive transistor has a fourth resistance value. When the photosensitive transistor is not turned on (not conducting), the photosensitive transistor has a third resistance value. The fourth resistance value is less than the third resistance value.

One end of the resistance circuit 517 is electrically connected to the photosensitive transistor, and the other end is electrically connected to the control circuit 60. The total resistance value of the resistance circuit 517 can be changed by the first resistance value and the second resistance value of the first comparison circuit 513. When the total resistance value of the resistance circuit 517 is a seventh resistance value, the control circuit 60 determines that the secondary side circuit 40 is not under a light load, and generates the corresponding voltage signal. When the total resistance value of the resistance circuit 517 is an eighth resistance value, the control circuit 60 can determine that the secondary side circuit 40 is under a light load, and generates the corresponding voltage signal.

When the secondary side circuit 40 is under a light load, the control circuit 60 increases the primary frequency to lower the secondary side power $V_o$. When the frequency detecting circuit 20 generates the corresponding potential $V_c$ greater than the predetermined level, the control circuit 60 determines that the primary frequency is between the second resonant frequency $\omega_r$ and the third resonant frequency $\omega_s$ according to the magnitude of the corresponding potential $V_c$. Then, the control circuit 60 temporarily stops outputting the control signal $S_c$ until the corresponding potential $V_c$ is less than the predetermined level.

Figure 5:
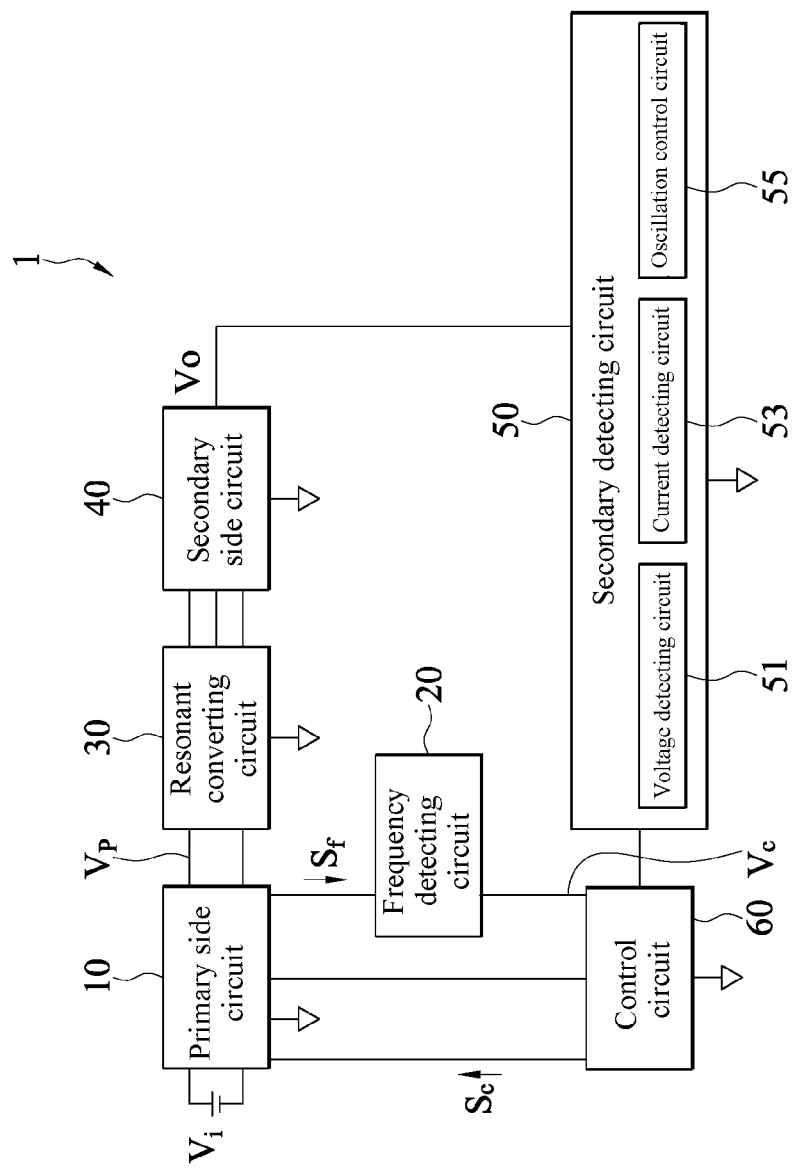
FIG. 5 illustrates a function block diagram of a third embodiment of the resonant power conversion device of the present disclosure.

FIG. 5 illustrates a function block diagram of a third embodiment of the resonant power conversion device of the present disclosure. According to this embodiment, the secondary detecting circuit 50 of the power conversion device includes a voltage detecting circuit 51, a current detecting circuit 53, and an oscillation control circuit 55.

The voltage detecting circuit 51 is configured to detect the voltage of the secondary side power $V_o$ and generate a fourth resistance value. The current detecting circuit 53 is configured to detect the current of the secondary side power $V_o$ and generate a sixth resistance value. The oscillation control circuit 55 is configured to convert the fourth resistance value and the sixth resistance value into the voltage signal.

Figure 6:
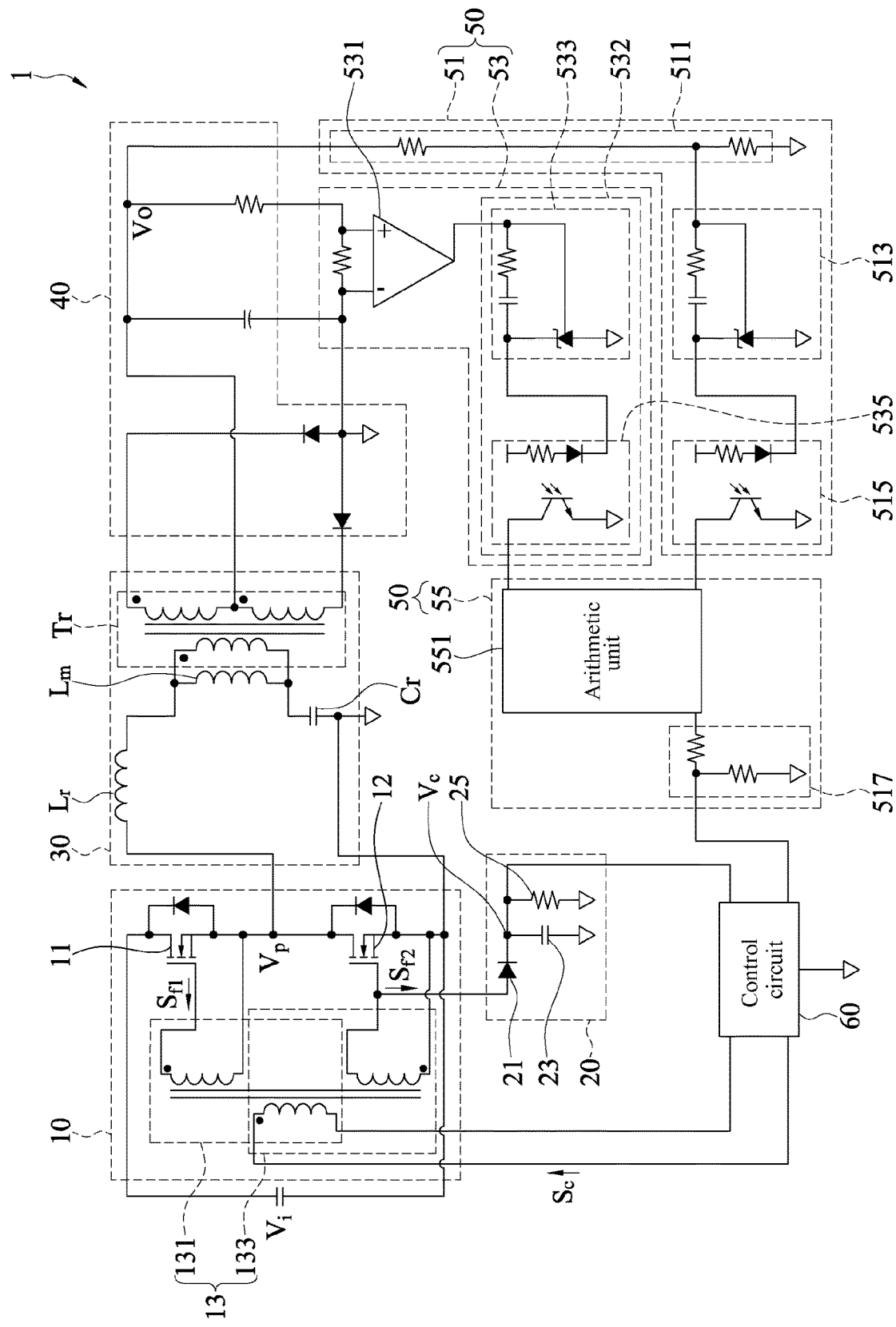
FIG. 6 illustrates a function block diagram of a fourth embodiment of the resonant power conversion device of the present disclosure.

FIG. 6 illustrates a function block diagram of a fourth embodiment of the resonant power conversion device of the present disclosure. The voltage detecting circuit 51 includes a voltage dividing circuit 511, a first comparison circuit 513, and a first isolation circuit 515. The operation mode of the voltage dividing circuit 511, the first comparison circuit 513, and the first isolation circuit 515 has been found in the above related paragraphs, and will not be described again.

The current detecting circuit 53 includes a detecting unit 531 and a feedback circuit 532. The detecting unit 531 is configured to detect the current of the secondary side power $V_o$ and convert the current of the secondary side power $V_o$ into a detecting voltage. The feedback circuit 532 has a reference level. The feedback circuit 532 compares the detecting voltage with the reference level. The feedback circuit 532 generates a fifth resistance value when the detecting voltage is less than the reference level, and the feedback circuit 532 generates the sixth resistance value when the detecting voltage is greater than the reference level (described in detail later). The sixth resistance value is less than the fifth resistance value.

The detecting unit 531 is, for example but not limited to, a differential amplifier.

The feedback circuit 532 includes a second comparison circuit 533 and a second isolation circuit 535. The second comparison circuit 533 is, for example but not limited to, a comparison circuit including a three-terminal shunt regulator having a reference level of 2.5 volts. The second isolation circuit 535 is, for example but not limited to, an isolation circuit including an optical coupler. When the photosensitive transistor of the second isolation circuit 535 is not turned on, the feedback circuit 532 generates the fifth resistance value. When the photosensitive transistor of the second isolation circuit 535 is turned on, the feedback circuit 532 generates the sixth resistance value.

In operation, the differential amplifier detects the current of the secondary side power $V_o$ and converts the current of the secondary side power $V_o$ into the detecting voltage. Then, the three-terminal shunt regulator compares the detecting voltage with 2.5 volts. When the detecting voltage is less than 2.5 volts, the light-emitting diode induces the resistance value of the photosensitive transistor changing into the fifth resistance value. When the detecting voltage is greater than 2.5 volts, the three-terminal shunt regulator drives the light-emitting diode to induce the resistance value of the photosensitive transistor into the sixth resistance value.

The oscillation control circuit 55 includes an arithmetic unit 551, and a resistance circuit 517. The arithmetic unit 551 calculates based on the fourth resistance value and the sixth resistance value to obtain a product (i.e., power of the secondary side power $V_o$) of the current and the voltage of the secondary side power $V_o$ output by the secondary side circuit 40 under a light load, and converts the product into an adjusted resistance value according to Ohm's law. The resistance circuit 517 receives the adjusted resistance value and generates the corresponding voltage signal according to the magnitude of the adjusted resistance value. The voltage signal is directly proportional to the adjusted resistance value.

The arithmetic unit 551 is, for example but not limited to, an integrated circuit (IC) having an arithmetic function.

One end of the resistance circuit 517 is electrically connected to the arithmetic unit 551, and the other end is electrically connected to the control circuit 60. The resistance value of the resistance circuit 517 can be varied in accordance with the adjusted resistance value. When the resistance circuit 517 does not receive the adjusted resistance value, the resistance value of the resistance circuit 517 is changed into the seventh resistance value, and the control circuit 60 determines that the secondary side circuit 40 is not under a light load. When the resistance circuit 517 receives the adjusted resistance value, the resistance value of the resistance circuit 517 is changed into the eighth resistance value, and the control circuit 60 determines that the secondary side circuit 40 is under a light load.

When the secondary side circuit 40 is under a light load, the control circuit 60 determines whether the corresponding potential $V_c$ is greater than a predetermined level. If so, the primary frequency is between the second resonant frequency $\omega_r$ and the third resonant frequency $\omega_s$, and the control circuit 60 can temporarily stop outputting the control signal $S_c$. If not, the primary frequency is less than the second resonant frequency $\omega_r$, and the control circuit 60 outputs the control signal $S_c$.

In summary, according to some embodiments, the resonant power conversion device 1 can determine whether the primary frequency is between the second resonant frequency $\omega_r$ and the third resonant frequency $\omega_s$ under a light load. If so, the output of the control signal $S_c$ is temporarily stopped.

What is claimed is:

1. A resonant power conversion device, comprising:
    a primary side circuit, configured to receive an input power to output a primary side power according to a control signal, wherein the control signal has a primary frequency, and a frequency of the primary side power corresponds to the primary frequency;
    a frequency detecting circuit, configured to detect the primary frequency and convert the primary frequency into a corresponding potential;
    a resonant converting circuit, configured to electrically couple the primary side power to output a resonant power;
    a secondary side circuit, configured to convert the resonant power into a secondary side power;
    a secondary detecting circuit, configured to detect the secondary side power and generate a voltage signal corresponding to the secondary side power; and
    a control circuit, configured to output the control signal corresponding to the voltage signal, and not to output the control signal when the corresponding potential is higher than a predetermined level;
    wherein the primary side circuit comprises:
    a primary side convertor, the primary side convertor comprising a subtractive polarity winding and an additive polarity winding, wherein the subtractive polarity winding is configured to generate a first gate control signal in response to the control signal, and the additive polarity winding is configured to generate a second gate control signal in response to the control signal.

2. The resonant power conversion device according to claim 1, wherein the primary side circuit further comprises:
    a first switch and a second switch, wherein the first switch and the second switch are connected in series, the in-series-connected the first and the second switches are connected in parallel to the input power, the first switch and the second switch works according to the control signal, and the first switch and the second switch are not conducting simultaneously.

3. The resonant power conversion device according to claim 2, wherein the frequency detecting circuit comprises:
    an isolation component, configured to receive one of the first gate control signal and the second gate control signal, and only allow the received first gate control signal or second gate control signal to pass in a single direction;
    an energy storage component, configured to receive the first gate control signal or the second gate control signal passing the isolation component to generate the corresponding potential, wherein the corresponding potential is directly proportional to the primary frequency; and
    an energy consuming component, connected in parallel to the energy storage component, configured to release the corresponding potential;
    wherein the primary frequency, the energy storage component and the energy consuming component determine the corresponding potential.

4. The resonant power conversion device according to claim 3, wherein the secondary detecting circuit comprises:
    a voltage detecting circuit, configured to detect a voltage of the secondary side power and generate a fourth resistance value;
    a current detecting circuit, configured to detect a current of the secondary side power and generate a sixth resistance value; and
    an oscillation control circuit, configured to receive the fourth resistance value and the sixth resistance value and convert the fourth resistance value and the sixth resistance value into the voltage signal.

5. The resonant power conversion device according to claim 4, wherein the voltage detecting circuit comprises:
    a voltage dividing circuit, configured to divide the voltage of the secondary side power to generate a voltage dividing value;
    a first comparison circuit, having a reference level, wherein the first comparison circuit is configured to compare the voltage dividing value with the reference level, the first comparison circuit generates a first resistance value when the voltage dividing value is less than the reference level, and the first comparison circuit generates a second resistance value when the voltage dividing value is greater than the reference level; and
    a first isolation circuit, wherein when the first comparison circuit has the second resistance value, the first isolation circuit generates a first current signal flowing to the first comparison circuit and the first isolation circuit generates a fourth resistance value, wherein when the first comparison circuit has the first resistance value, the first isolation circuit does not generate the first current signal and the first isolation circuit generates a third resistance value, and wherein the fourth resistance value is less than the third resistance value.

6. The resonant power conversion device according to claim 5, wherein the current detecting circuit comprises:
    a detecting unit, configured to detect the current of the secondary side power and convert the current of the secondary side power into a detecting voltage; and
    a feedback circuit, having a reference level, wherein the feedback circuit compares the detecting voltage with the reference level, the feedback circuit generates a fifth resistance value when the detecting voltage is less than the reference level, the feedback circuit generates the sixth resistance value when the detecting voltage is greater than the reference level, and the sixth resistance value is less than the fifth resistance value.

7. The resonant power conversion device according to claim 6, wherein the oscillation control circuit comprises:
    an arithmetic unit, configured to generate an adjusted resistance value by calculating based on the fourth resistance value and the sixth resistance value; and
    a resistance circuit, configured to receive the adjusted resistance value and generate the corresponding voltage signal according to the magnitude of the adjusted resistance value, the voltage signal being directly proportional to the adjusted resistance value.

8. The resonant power conversion device according to claim 3, wherein the secondary detecting circuit comprises a voltage detecting circuit, configured to detect the voltage of the secondary side power and generate a voltage signal.

9. The resonant power conversion device according to claim 8, wherein the voltage detecting circuit comprises:

a voltage dividing circuit, configured to divide the voltage of the secondary side power to generate a voltage dividing value;

a first comparison circuit, having a reference level, wherein the first comparison circuit is configured to compare the voltage dividing value with the reference level, and generate a second resistance value when the voltage dividing value is greater than the reference level;

a first isolation circuit, wherein when the first comparison circuit has a first resistance value, the first isolation circuit cannot generate a first current signal and generates the third resistance value on the secondary side, wherein when the first comparison circuit has the second resistance value, the first isolation circuit generates the first current signal and generates the fourth resistance value on the secondary side, and wherein the fourth resistance value is less than the third resistance value; and a resistance circuit, configured to receive a resistance value of the first isolation circuit and generate the corresponding voltage signal according to the magnitude of the resistance value of the first isolation circuit, wherein the voltage signal is directly proportional to the resistance value of the first isolation circuit.

10. The resonant power conversion device according to claim 2, wherein the frequency detecting circuit comprises:

an isolation component, configured to receive the control signal, and only allow the control signal to pass in a single direction;

an energy storage component, configured to receive the passing control signal to generate a corresponding potential; and an energy consuming component, connected in parallel to the energy storage component, configured to release the corresponding potential, wherein the corresponding potential is directly proportional to the primary frequency;

wherein the primary frequency, the energy storage component and the energy consuming component determine the corresponding potential.

11. The resonant power conversion device according to claim 1, wherein the frequency detecting circuit comprises:

an isolation component, configured to receive the control signal, and only allow the control signal to pass in a single direction;

an energy storage component, configured to receive the passing control signal to generate a corresponding potential; and an energy consuming component, connected in parallel to the energy storage component, configured to release the corresponding potential, wherein the corresponding potential is directly proportional to the primary frequency;

wherein the primary frequency, the energy storage component and the energy consuming component determine the corresponding potential.

* * * * *